United States Patent [19]

Armbruster et al.

[11] Patent Number: 4,929,648
[45] Date of Patent: May 29, 1990

[54] ALKALINE PHENOLIC RESOLE RESIN BINDERS

[75] Inventors: David R. Armbruster, Forest Park; Kwok-Tuen Tse, Chicago, both of Ill.

[73] Assignee: Acme Resin Corporation, Westchester, Ill.

[21] Appl. No.: 328,174

[22] Filed: Mar. 24, 1989

[51] Int. Cl.⁵ .............................................. B22G 1/22
[52] U.S. Cl. .................................. 523/147; 524/140; 524/375
[58] Field of Search ................ 523/147; 524/140, 375

[56] References Cited

U.S. PATENT DOCUMENTS 2,623,865 12/1952 Dietz .................................. 524/375
4,780,489 10/1988 Dunnavan et al. ................ 523/147

Primary Examiner—Lewis T. Jacobs
Assistant Examiner—Karen Hellender
Attorney, Agent, or Firm—Rockey and Rifkin

[57] ABSTRACT

A binder composition which comprises an aqueous alkaline solution of a phenolic resole resin and an additive wherein the additive is phenoxyethanol or a derivative of phenoxyethanol.

15 Claims, No Drawings

ALKALINE PHENOLIC RESOLE RESIN BINDERS

FIELD OF THE INVENTION

This invention relates to binder compositions, moldable compositions which include the binders and aggregate material, and a process for making moldable compositions from them. More particularly, the invention relates to foundry binder compositions, moldable compositions including the same and aggregate material, and foundry cores or molds made therefrom, including a process for their manufacture.

BACKGROUND OF THE INVENTION

Binders or binder systems for foundry cores and molds are well known. In the foundry art, cores or molds for making metal castings are normally prepared from a mixture of an aggregate material, such as sand, and a binding amount of a binder or binder system. Typically, after the aggregate material and binder have been mixed, the resulting mixture is rammed, blown or otherwise formed to the desired shape or pattern, and then cured with the use of catalysts and/or heat to a solid, cured state.

Resin binders used in the production of foundry molds and cores are often cured at high temperatures to achieve the fast-curing cycles required in foundries. However, in recent years, resin binders have been developed which cure at low temperatures, to avoid the need for high-temperature curing operations which have higher energy requirements and which often result in the production of undesirable fumes.

One group of processes which do not require heating in order to achieve curing of the resin binder are referred to as "cold-box" processes. In such processes, the binder components are coated on the aggregate material, such as sand, and the material is blown into a box of the desired shape. Curing of the binder is carried out by passing a gaseous catalyst or hardener at ambient temperatures through the molded resin-coated material.

One such "cold-box" process employs an aqueous alkaline solution of a phenolic resole resin as the binder. This binder is cured by passing the volatile ester through the molded resin-coated material. The process is described in detail in U.S. Pat. No. 4,468,359 (Re. 32,720) which is incorporated herein by reference in its entirety.

The ester cured process is superior to some of the earlier processes from an environmental standpoint. However, the tensile strengths of the cores made by this process tend to be somewhat lower than those prepared by other "cold-box" processes. Previous workers have sought to improve the strength of the cores obtained using the ester cure process by adding modifiers to the resin. Such modifiers include: ketone alcohols and ether alcohols such as furfuryl alcohol and monoalkyl ethers of glycols or diglycols, U.S. Pat. No. 4,780,489.

We have now discovered that certain phenoxyethanols, not hitherto used with ester-cured phenolic binder systems, speed the rate of cure of such systems, giving molds and cores with higher tensile strength. This reduces breakage of the cores when they are removed from the core boxes and handled. Furthermore, they are useful at low levels minimizing organic emissions and volume of gas generated on pouring. This reduces gas related defects.

SUMMARY OF THE INVENTION

In accordance with this invention, there is provided a binder composition which comprises:
(a) an aqueous alkaline solution of a phenolic resole resin, said aqueous solution having a solids content of from about 40% to about 75% by weight, said phenolic resole having an aldehyde:phenol molar ratio of from about 1.2:1 to about 2.6:1 and an alkali:phenol molar ratio of from about 0.2:1 to about 1.2:1; and
(b) an additive in an amount of at least about 1% by weight of the phenolic resole resin, said additive being soluble in the aqueous alkaline solution and having the general formula:

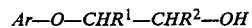

where Ar = phenyl or phenyl substituted with one or more halogen, hydroxy, alkoxy or alkyl groups and where $R^1$ and $R^2$ may be the same or different and = hydrogen, alkyl or alkoxy.

Further provided, in accordance with this invention, are foundry molding compositions which comprise a mixture of the binders of this invention with granular refractory material and a process for the production of foundry cores and molds using this foundry molding composition.

DESCRIPTION OF THE PREFERRED EMBODIMENT

The phenolic resole resins used in the practice of this invention are prepared by methods well known in the art. In general, they are prepared by reacting a molar excess of an aldehyde with phenol under alkaline conditions. Various phenols may be used in the preparation of the resin, the preferred phenolic material is unsubstituted phenol. Likewise, any of the commonly used aldehydes may be used in the preparation of the resin. The preferred aldehyde is formaldehyde.

Any of the commonly used basic catalysts may be used to prepare the phenolic resole resin. However, the preferred alkali in the product is KOH. For this reason, this alkali may be used in the manufacture of the resin, or may be added to the resin subsequent to its preparation. The alkalinity of the resin is expressed in terms of the molar ratio of KOH to the phenol in the resin. However, other alkalis are not excluded and may be used alone or in combination with KOH.

The molar ratio of KOH:phenol in the resin solution is in the range of from about 0.2:1 to about 1.2:1. The preferred molar range of KOH:phenol is from about 0.4:1 to about 0.9:1.

The molar ratio of aldehyde:phenol is from about 1.2:1 to about 2.6:1. The preferred molar range of aldehyde:phenol is from about 1.5:1 to about 2.2:1.

As noted above, the binder of this invention is an aqueous solution. The solids content of the aqueous solution is in the range of from about 40% to about 75% by weight. The solution also contains, in addition to water, an additive.

The additives employed in the practice of this invention are phenoxyethanols having the general formula:

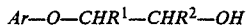

In this formula, the Ar is the phenyl group or the phenyl group substituted with one or more halogens, hydroxy, alkoxy or alkyl groups. $R^1$ and $R^2$ in the formula may be the same or different and represent hydrogen, alkyl or alkoxy.

Exemplary additives include phenoxyethanol, 1-phenoxy-2-propanol, 2-(4-bromophenoxy)ethanol and 2-(4-chlorophenoxy)ethanol. Phenoxyethanol is a particularly useful additive in the practice of this invention.

The additive is used in an amount of at least about 1% by weight of the phenolic resole resin. A preferred concentration is from about 2% to about 6% by weight of the phenolic resole resin, but greater concentrations may be beneficial in some circumstances. The additive should be one in that the amount used is soluble in the aqueous alkaline solution of the phenolic resole resin.

The binders of this invention are useful for preparing foundry molding compositions. Such compositions comprise a granular refractory material and from about 0.5% to about 8% by weight of the refractory material of the aqueous alkaline binder solution. The granular refractory materials used in the molding composition may be any of the refractory materials employed in the foundry industry for the production of molds and cores, such as silica sand, chromite sand, zircon sand or olivine sand and mixtures thereof. When such sands are used, it is preferred that the binder solution be present in an amount of from about 1% to about 3% by weight of the sand.

Other commonly employed additives such as ure and organosilanes can be optionally used in the binder compositions of this invention. The organosilanes, which are known coupling agents, enhance the adhesion of the binder to the sand. Examples of useful coupling agents of this type include aminosilanes, epoxysilanes, mercaptosilanes, hydroxysilanes and ureidosilanes.

When the binders of this invention are used for the production of foundry cores and molds, the refractory material such as foundry sand is mixed thoroughly with the aqueous alkaline binder solution. Mixing is carried out until substantially all of the sand particles are coated completely and uniformly with the binder solution. The refractory material coated with the binder is then placed in a vented core or mold box, such as is used in conventional "cold-box" processes.

The mixture of sand and resin is hardened by passing a volatile ester through the material in the vented box. The preferred esters used for gasing the mixture are the lower alkyl formates. The most preferred ester is methyl formate. As is known in the art, such esters are not usually used as a pure gas, but as a vapor or aerosol in an inert carrier gas. Such inert carrier gases are those which do not react with the ester or have an adverse affect on the curing reaction of the properties of the product. Suitable gases include air, nitrogen or argon.

The following specific examples illustrate the present invention; They are not intended to limit the invention in any way. Unless otherwise indicated, all parts and percentages are by weight.

EXAMPLE 1

A resole resin was prepared by adding slowly 1,276 parts of 50% aqueous formaldehyde to a mixture of 1,000 parts of phenol, 800 parts of 45% aqueous KOH and 800 parts of water. The temperature of the mixture was held at 80° C. during the addition and for an additional two hours. Water was then removed from the mixture by heating it under vacuum at 50° C. until the refractive index, measured at 25° C., was 1.4912. The mixture was again heated at 80° C. until its viscosity, measured at 25° C., was 160 cps. The mixture was cooled and mixed with 16 parts of gammaaminopropyltriethoxysilane.

To the alkaline phenolic resole resin solution was added various amounts of phenoxyethanol. Each resin sample was coated on Wedron 530 sand in a Hobart mixer. The amount of resin used was 1.75% of the weight of the sand. The coated sands were then tested making standard AFS (dog bone) tensile cores. Test cores were prepared by blowing the mixture at 80 lbs. per square inch (psi) air pressure into a Redford laboratory three cavity cold box machine. The cores were cured by gassing with a 70:30 mixture of methyl formate and air for seven seconds. Tensile strengths were measured at one minute, 30 minutes, one hour and 24 hours after gassing, using a Detroit Testing Machine Company Model CST Tensile Tester. Comparative tests were run on cores prepared using the binder without any phenoxyethanol. Results of the test given in Table I show that cores made using the phenoxyethanol additive of this invention have superior strength over those prepared without the liquid additive. Such improved strengths are important in reducing the amount of core breakage when the binders are used in foundry operations:

TABLE I

Tensile Strength of Cores Prepared Using Binders Containing Various Amounts of Phenoxyethanol

| Phenoxyethanol Amount (% by weight of Resin) | Tensile Strength (psi) | | | |
|---|---|---|---|---|
| | 1 min. | 30 min | 1 hour | 24 hours |
| 0 (comparative test) | 135 | 145 | 139 | 156 |
| 2 | 133 | 153 | 148 | 171 |
| 4 | 134 | 180 | 187 | 173 |
| 8 | 103 | 161 | 176 | 188 |

EXAMPLE 2

The general procedure of Example 1 was followed except that various liquid additives were added to the alkaline phenolic resole resin in an amount of 4% by weight of the resin. Comparative tests were run using resin with no additive. The results given in Table II show that various derivatives of phenoxyethanol are also useful additives in the binder compositions of this invention.

TABLE II

Tensile Strengths of Cores Prepared Using binders With Various Additives

| Additive | Tensile Strength (psi) | | | |
|---|---|---|---|---|
| | 1 min. | 30 min. | 1 hour | 24 hours |
| None (comparative test) | 135 | 145 | 139 | 156 |
| Phenoxyethanol | 134 | 180 | 187 | 173 |
| 1-phenoxy-2-propanol | 132 | 150 | 162 | 174 |
| 2-(4-Bromophenoxy)ethanol | 121 | 137 | 143 | 167 |
| 2-(4-Chlorophenoxy)ethanol | 135 | 169 | 180 | 172 |

EXAMPLE 3

The general procedure of Example 1 was followed using as a liquid additive phenoxyethanol in an amount of 4% by weight of the phenolic resole resin. Comparative tests were run using as addities 4% by weight of the phenolic resin of furfuryl alcohol and butylcarbitol. The results given in Table III show the superiority of phenoxyethanol over the additives previously used for this purpose.

TABLE III

Tensile Strengths of Cores Prepared Using binders With Various Additives

| Additive | Tensile Strength (psi) | | | |
|---|---|---|---|---|
| | 1 min. | 30 min. | 1 hour | 24 hours |
| Phenoxyethanol | 134 | 180 | 187 | 173 |
| Furfuryl Alcohol (Comparative Test) | 129 | 148 | 160 | 162 |
| Butylcarbitol (Comparative Test) | 123 | 170 | 178 | 156 |

EXAMPLE 4

A mixture of 24.71 parts of phenol, 9.45 parts of 50% aqueous formaldehyde and 0.84 parts of 50% aqueous sodium hydroxide solution was heated in a vessel to 80° C. The temperature was held at 80° C. for 10 minutes using cooling as required. Then an additional 21.96 parts of 50% aqueous formaldehyde was added over a period of about 25 minutes using cooling as necessary to hold the temperature at 80° C. to 82° C. The mixture was then held at 80° C. for three hours, cooled to 50° C. and 23.34 parts of 50% aqueous potassium hydroxide solution was added at such a rate as to hold the temperature below 60° C. with cooling. Then 4.65 parts of water were added, and the mixture was heated to 80° C., and held at this temperature until the viscosity of the mixture measured at 25° C. was 150 cps. The mixture was cooled and 0.36 part of gamma-aminopropyltriethoxysilane was added. The alkaline phenolic resole resin solution was mixed with various amounts of phenoxyethanol and the resulting resin samples were used to prepare test cores by the method given in Example 1. Comparative tests were run on cores prepared using the binder without any phenoxyethanol and with furfuryl alcohol and butylcarbitol. The results given in Table IV again show that phenoxyethanol is effective in increasing the tensile strengths of cores made using the binders containing this additive.

TABLE IV

Tensile Strengths of Cores Prepared Using binders With Various Additives

| Additive | Tensile Strength (psi) | | | |
|---|---|---|---|---|
| | 1 min. | 30 min. | 1 hour | 24 hours |
| None (Comparative Test) | 89 | 93 | 96 | 112 |
| 2% Phenoxyethanol | 94 | 102 | 106 | 128 |
| 4% Phenoxyethanol | 94 | 114 | 115 | 148 |
| 8% Phenoxyethanol | 98 | 127 | 144 | 170 |
| 4% Furfuryl Alcohol (Comparative Test) | 92 | 99 | 102 | 112 |
| 4% Butylcarbitol (Comparative Test) | 94 | 116 | 116 | 146 |

Thus, it is apparent that there has been provided, in accordance with this invention, a foundry binder composition that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to include all such alternatives, modifications and variations as set forth within the spirit an broad scope of the appended claims:

WHAT IS CLAIMED IS:

1. A binder composition which comprises:
    (a) an aqueous alkaline solution of a phenolic resole resin, said aqueous solution having a solids content of from about 40% to about 75% by weight, said phenolic resole having an aldehyde:phenol molar ratio of from about 1.2:1 to about 2.6:1 and an alkali:phenol molar ratio of from about 0.2:1 to about 1.2:1; and
    (b) an additive in an amount of at least about 1% by weight of the phenolic resole resin, said additive being soluble in the aqueous alkaline solution and having the general formula:

$$Ar-O-CHR^1-CHR^2-OH$$

where Ar = phenyl or phenyl substituted with one or more halogen, hydroxy, alkoxy or alkyl groups and where $R^1$ and $R^2$ may be the same or different and = hydrogen, alkyl or alkoxy.

2. The binder composition of claim 1 wherein the additive is present in an amount of from about 2% to about 6% by weight of the phenolic resole resin.
3. The binder composition of claim 1 wherein the additive is phenoxyethanol.
4. The binder composition of claim 1 wherein the aldehyde:phenol molar ratio is from about 1.5 1 to about 2.2:1.
5. The binder composition of claim 1 wherein the alkali used to prepare aqueous alkaline solution is selected from the group consisting of potassium hydroxide, sodium hydroxide and mixtures thereof.
6. The binder composition of claim 5 wherein the molar ratio of alkali to phenol is from about 0.4:1 to about 0.9:1.
7. The binder composition of claim 1 which further comprises a silane.
8. A foundry molding composition which comprises:
    (a) a granular refractory material;
    (b) from about 0.5 to about 8% by weight of the refractory material of an aqueous alkaline solution of a phenolic resole resin, said aqueous solution having a solids content of from about 40% to about 75% by weight, said phenolic resole having an aldehyde:phenol molar ratio of from about 1.2:1 to about 2.6:1 and an alkali:phenol molar ratio of from about 0.2:1 to about 1.2:1; and
    (c) an additive in an amount of at least about 1% by weight of the phenolic resole resin, said additive being soluble in the aqueous alkaline solution and having the general formula:

$$Ar-O-CHR^1-CHR^2-OH$$

where Ar = phenyl or phenyl substituted with one or more halogen, hydroxy, alkoxy or alkyl groups and where $R^1$ and $R^2$ may be the same or different and = hydrogen, alkyl or alkoxy.

9. The foundry molding composition of claim 8 wherein the granular refractory material is selected from the group consisting of silica sand, chromite sand, zircon sand, olivine sand and mixtures thereof.
10. The foundry molding composition of claim 9 wherein the aqueous alkaline solution of a phenolic resole resin is present in an amount of about 1% to about 3% by weight of the sand.
11. The foundry molding composition of claim 8 wherein the additive is present in an amount of from about 2% to about 6% by weight of the phenolic resole resin.
12. The foundry molding composition of claim 8 wherein the additive is phenoxyethanol.

13. The foundry molding composition of claim 8 wherein the alkali used to prepare the aqueous alkaline solution is selected from the group consisting of potassium hydroxide, sodium hydroxide and mixtures thereof.

14. The foundry molding composition of claim 13 wherein the molar ratio of alkali to phenol is from about 0.4:1 to about 0.9:1.

15. The foundry molding composition of claim 8 which further comprises a silane.

* * * * *